US006791087B1

United States Patent
Okumura

(10) Patent No.: US 6,791,087 B1
(45) Date of Patent: Sep. 14, 2004

(54) DIFFERENTIAL INFRARED DETECTOR

(75) Inventor: Yoshiharu Okumura, Ohtsu (JP)

(73) Assignee: Optex Co., Ltd., Shiga-ken (JP)

( * ) Notice: Subject to any disclaimer, the term of this patent is extended or adjusted under 35 U.S.C. 154(b) by 176 days.

(21) Appl. No.: 10/153,685

(22) Filed: May 24, 2002

(51) Int. Cl.$^7$ ............................. B41J 2/05; G01D 21/04
(52) U.S. Cl. ....................... 250/342; 356/213
(58) Field of Search ........................... 250/342, DIG. 1, 250/339.04, 339.06, 339.11, 341.2; 356/213, 215, 218, 221, 223, 227, 229, 230

(56) References Cited

U.S. PATENT DOCUMENTS

| | | | | |
|---|---|---|---|---|
| 5,604,584 | A | * | 2/1997 | Iwasaki ..................... 356/218 |
| 5,629,676 | A | | 5/1997 | Kartoun et al. |
| 6,045,257 | A | * | 4/2000 | Pompei et al. .............. 374/132 |
| 6,241,384 | B1 | * | 6/2001 | Pompei et al. .............. 374/126 |
| 6,402,371 | B2 | * | 6/2002 | Pompei et al. .............. 374/128 |
| 2002/0044151 | A1 | * | 4/2002 | Ijima et al. ................. 345/601 |

FOREIGN PATENT DOCUMENTS

| | | | |
|---|---|---|---|
| EP | 0678385 A1 | * 10/1995 | ............ B41J/2/05 |
| JP | 61-18236 | 5/1986 | |

* cited by examiner

*Primary Examiner*—Constantine Hannaher
*Assistant Examiner*—Otilia Gabor
(74) *Attorney, Agent, or Firm*—Wenderoth, Lind & Ponack, L.L.P.

(57) ABSTRACT

A differential infrared detector has: a detection element which detects infrared radiation in a predetermined detection area, converts a radiation energy thereof into an electric signal, and outputs the signal; and a discrimination circuit which calculates a variation amount of the radiation energy, based on the output signal, and generates a human body detection signal if the variation amount is equal to or greater than a predetermined level. This differential infrared detector comprises: an ambient temperature detection circuit which generates a voltage, based on an ambient temperature in the detection area; and a sensitivity correction circuit which is arranged to increase detection sensitivity of the output signal produced by the detection element if the ambient temperature is within the predetermined temperature range, based on the voltage.

19 Claims, 5 Drawing Sheets

(a)

(b)

DIFFERENTIAL INFRARED DETECTOR

BACKGROUND OF THE INVENTION

The present invention relates to a differential infrared detector which detects the presence of a person by detecting a difference between the surface temperature of a human body and the ambient temperature.

Generally, a differential infrared detector detects a difference between the surface temperature of a human body and the ambient temperature, and generates a signal which corresponds to the difference. As shown in FIG. 11, the temperature difference decreases as the ambient temperature approaches the surface temperature of a human body (e.g. 37° C.). As for the ambient temperature, it varies considerably from season to season, and, even in one season, daytime temperature and nighttime temperature may change greatly. Hence, the differential infrared detector is desired to take its installation environment into consideration. To deal with a narrow difference between the surface temperature of a human body and the ambient temperature, conventional techniques have attempted to increase the detection sensitivity. Nevertheless, a conventional detector with an increased detection sensitivity detects even a negligible change of the radiation energy in the detection area, which results in improper operations. In order to solve this defect, Japanese Examined Patent Publication No. S61-18236 discloses a sensitivity-compensatory detection apparatus. With detecting the ambient temperature, this detection apparatus increases the detection sensitivity if the ambient temperature falls in a high temperature range, whereas it decreases the detection sensitivity if the ambient temperature is in a low temperature range.

Regarding the detection sensitivity problem which results from a change of the difference between the ambient temperature and the human body temperature, another solution is disclosed in U.S. Pat. No. 5,629,676. This disclosure seeks to apply an ideal amplifier gain to a PIR (passive infrared) detector, particularly when the ambient temperature exceeds the human body temperature. This technology employs a microprocessor. Referring to a circuit diagram of the PIR intrusion detector in FIG. 7, an output from a PIR sensing element 12 biased by a resistor 15 or from a thermopile or pyroelectric device is fed, as an amplified contrast signal 16, to an A/D port 18 of a microprocessor 17. In addition, an ambient temperature signal 21 from a thermistor 22 is fed to an A/D port 20 of the microprocessor 17. Thus, these signals implement a computer program. The computer program recognizes the ambient temperature based on the output from the thermistor 22, and compares the amplified contrast signal 16 with a variable threshold value dependent on the value of the ambient temperature. If the comparison result indicates the presence of a person, the computer program generates an alarm signal. In this technology, a series of signal processing operations are controlled by a computer.

SUMMARY OF THE INVENTION

The present invention intends to realize a differential infrared detector whose detection sensitivity does not deteriorate even when the difference between the surface temperature of a human body and the ambient temperature is small. And yet, this detector is obtainable at a low production cost and thus highly economical.

In order to achieve this object, an improved differential infrared detector of the present invention is of the type having: a detection element which detects infrared radiation in a predetermined detection area, converts a radiation energy thereof into an electric signal, and outputs the signal; and a discrimination circuit which calculates, based on the output signal, a variation amount of the radiation energy which varies on entry of a person into the detection area, the discrimination circuit comparing the variation amount with a predetermined level and, if the variation amount is equal to or greater than the predetermined level, generating a human body detection signal. This differential infrared detector is characterized in comprising: an ambient temperature detection circuit which generates a voltage, based on an ambient temperature in the detection area; and a sensitivity correction circuit which receives the voltage from the ambient temperature detection circuit and discriminates, based on the received voltage, whether the ambient temperature is within a predetermined temperature range, the sensitivity correction circuit being arranged to increase detection sensitivity of the output signal produced by the detection element, if the ambient temperature is judged to be within the predetermined temperature range.

Owing to this arrangement, the ambient temperature detection circuit generates a voltage which changes with ambient temperature. Therefore, the ambient temperature can be specified by recognizing the voltage. Accordingly, the sensitivity correction circuit can recognize the ambient temperature based on the voltage, and discriminate whether to raise or lower the detection sensitivity of the output signal which is produced by the detection element.

To be specific about this arrangement, the ambient temperature detection circuit comprises a thermistor and two series-connected resistors one of which is connected with the thermistor. As for the sensitivity correction circuit, it may comprise a logic circuit which receives input voltages composed of a voltage between the two resistors and a voltage between the thermistor and the resistor connected with the thermistor. Based on the input voltages, the logic circuit discriminates whether the ambient temperature is within a predetermined temperature range. If the ambient temperature is judged to be within the predetermined temperature range, the logic circuit generates a sensitivity switching signal for increasing an amplifier gain.

Further, the sensitivity correction circuit may comprise an amplifier circuit which is connected to a later stage of the logic circuit and which has a plurality of resistors provided on an input side of the amplifier circuit. In this case, an increase rate of the amplifier gain is determined by a resistance ratio of these resistors.

Alternatively, this logic circuit may generate a sensitivity switching signal for lowering a trigger level, if the ambient temperature is within the predetermined temperature range.

Regarding this arrangement, the sensitivity correction circuit may comprise a comparator which is connected to a later stage of the logic circuit and which has a plurality of resistors provided on an input side of the comparator. In this case, a lowering rate of the trigger level is determined by a resistance ratio of these resistors.

The logic circuit applied in the above arrangements is constituted with an Exclusive-OR circuit (hereinafter, "XOR circuit") or an equivalent circuit of the XOR circuit.

Preferably, a resistor is connected in between an output stage of the logic circuit and a previous stage of the amplifier circuit, and also connected in series with a grounded capacitor. In this arrangement, a voltage between the resistor and the capacitor is supplied, as a sensitivity switching signal, to the amplifier circuit.

As a result, the sensitivity switching signal supplied to the amplifier circuit has a waveform which rises and falls gently, so that generation of noise is suppressed when the sensitivity is switched.

BRIEF DESCRIPTION OF THE DRAWINGS

FIGS. 9(a) and (b) are diagrams for explaining the operations in the embodiments of the present invention, wherein FIG. 9(a) shows a change of an amplifier gain and FIG. 9(b) shows a change of a trigger level.

DETAILED DESCRIPTION OF THE INVENTION

Now, embodiments of the present invention are described with reference to the drawings.

Figure 1:
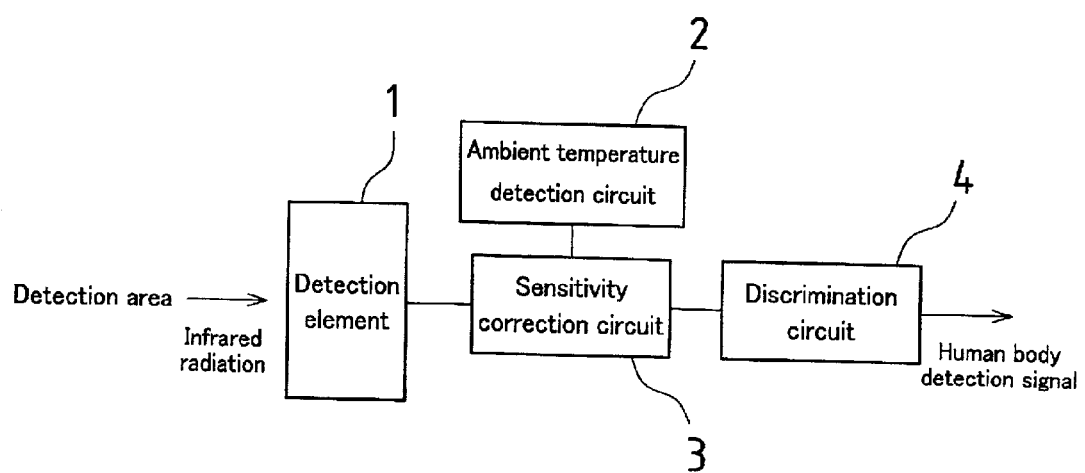
FIG. 1 is a block diagram representing embodiments of the present invention.

FIG. 1 is a block diagram representing embodiments of the present invention.

A differential infrared detector is constructed as shown in FIG. 1. A detection element 1 detects infrared radiation in a predetermined detection area, converts the radiation energy into an electric signal, and outputs the signal. An ambient temperature detection circuit 2 generates a voltage, based on an ambient temperature in the detection area. The voltage generated in the ambient temperature detection circuit 2 is supplied to a sensitivity correction circuit 3 which discriminates, based on the supplied voltage, whether the ambient temperature is within a predetermined temperature range. If the ambient temperature is judged to be within the predetermined temperature range, the sensitivity correction circuit 3 is arranged to increase detection sensitivity of the output signal produced by the detection element 1. Based on the output signal which is supplied from the detection element 1 and whose intensity is increased as necessary, a discrimination circuit 4 calculates a variation amount of the radiation energy which varies on entry of a person into the detection area. Then, the discrimination circuit 4 compares the variation amount with a predetermined level. If the variation amount is equal to or greater than the predetermined level, a human body detection signal is generated by the discrimination circuit 4.

Regarding the ambient temperature detection circuit 2 and the sensitivity correction circuit 3 of the present embodiments, specific examples are given below with respective circuit diagrams.

Figure 2:
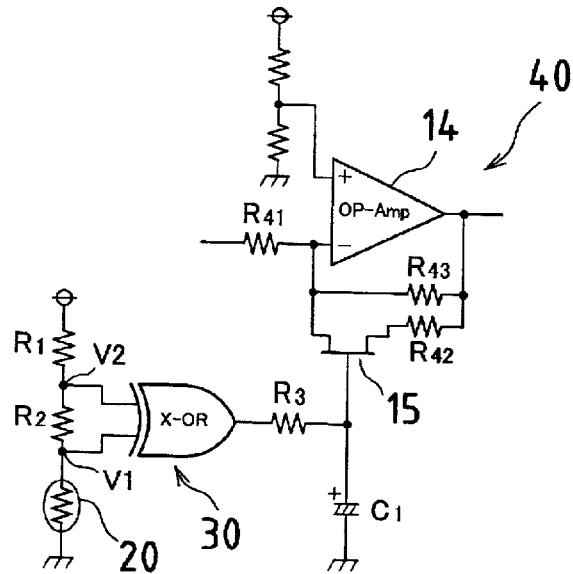
FIG. 2 is a main circuit diagram of a first embodiment of the present invention.

FIG. 2 is a main circuit diagram of a first embodiment.

In the first embodiment, the ambient temperature detection circuit 2 comprises a thermistor 20 and two series-connected resistors $R_1$, $R_2$ one of which is connected with the thermistor 20. As the characteristics of the thermistor 20, the resistance decreases with a rise of ambient temperature, whereas the resistance increases with a drop of ambient temperature. To take advantage of such characteristics, a voltage V1 between the thermistor 20 and the resistor $R_2$ connected with the thermistor 20 and a voltage V2 between the two resistors $R_1$, $R_2$ are supplied as input voltages to the sensitivity correction circuit 3. Since the voltages V1, V2 become greater at a higher ambient temperature (see FIG. 8), the sensitivity correction circuit 3 can obtain the ambient temperature, on recognition of the input voltages, based on the relation between these voltages and the ambient temperature.

The sensitivity correction circuit 3 includes a logic circuit 30 made up of an XOR circuit and an amplifier circuit 40. When the voltages V1, V2 are supplied as input voltages to the XOR, circuit 30, the ambient temperature is detected based on the voltages V1, V2. Specifically, the logic circuit 30 performs a logical operation to determine whether the ambient temperature is within a predetermined temperature range. If the ambient temperature is judged to be within the predetermined temperature range, the logic circuit 30 produces a detection sensitivity switching signal. This detection sensitivity signal is fed to the amplifier circuit 40 as a voltage between a resistor $R_3$ and a grounded capacitor $C_1$. In this regard, the resistor $R_3$ is understood to be connected in between the output stage of the logic circuit 30 and the previous stage of the amplifier circuit 40, and also connected in series with the capacitor $C_1$. The amplifier circuit 40 includes a switching part of a FET 15 and a detection signal amplifying part of an operational amplifier 14 and resistors $R_{41}$, $R_{42}$, $R_{43}$.

The detector of the first embodiment operates in the following manner.

Figure 8:
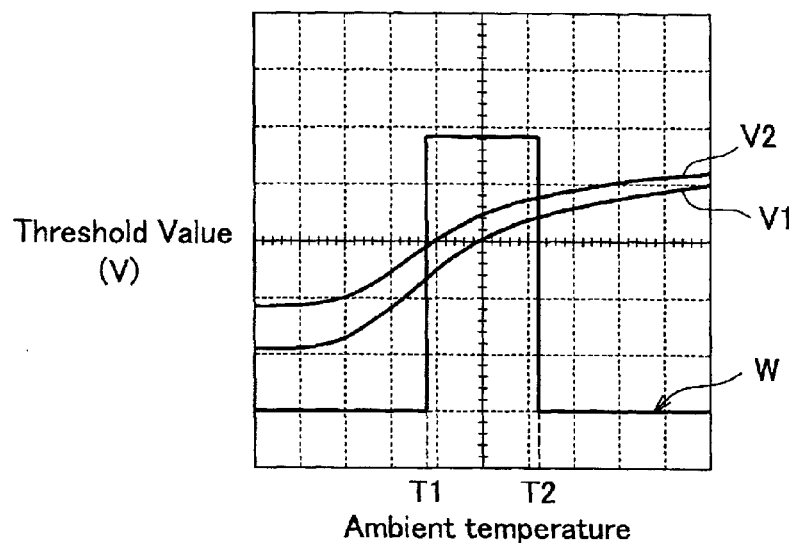
FIG. 8 is a diagram for explaining the operation in the embodiments of the present invention.
Figure 9:
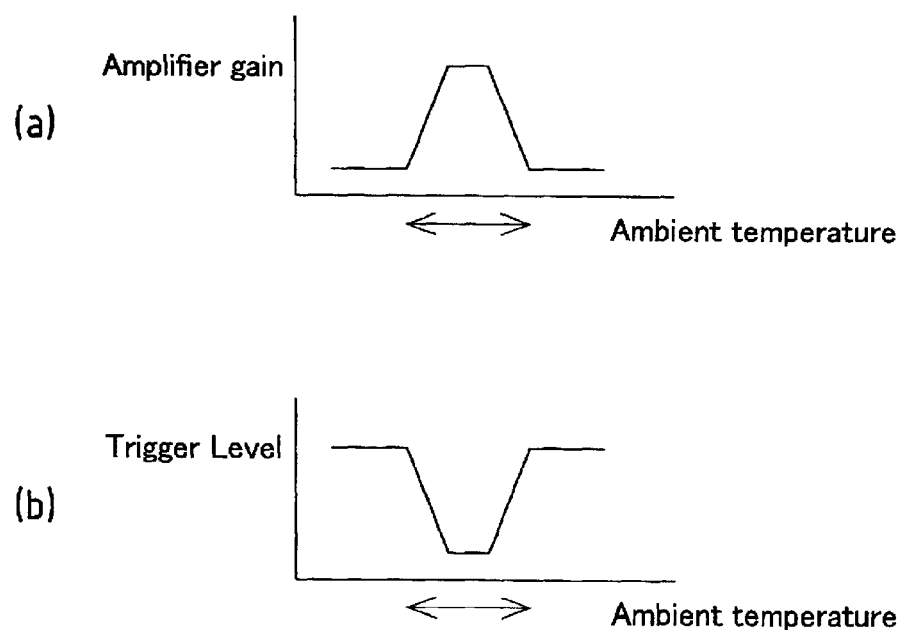

When a resistance of the thermistor 20 changes with ambient temperature, the input voltages V1, V2 vary as well. FIG. 8 shows variations of threshold values (V) of V1 and V2 relative to ambient temperature, together with an output signal waveform W of the logic circuit which switches stepwise from Low (0) to High (1) to Low (0). While the ambient temperature falls in a particular temperature range, the output signal waveform is at High (1), during which a sensitivity switching signal is generated. In this embodiment, the ambient temperature is divided into three ranges, and the detection sensitivity is switched in the second temperature range (between T1 and T2). The sensitivity switching signal is fed to the FET 15 and activates the operational amplifier 14 which is provided with resistors $R_{41}$, $R_{42}$, $R_{43}$ having a certain resistance ratio. Consequently, the amplifier gain is increased as shown in FIG. 9(a), thereby increasing the detection sensitivity of the detection signal.

Figure 10:
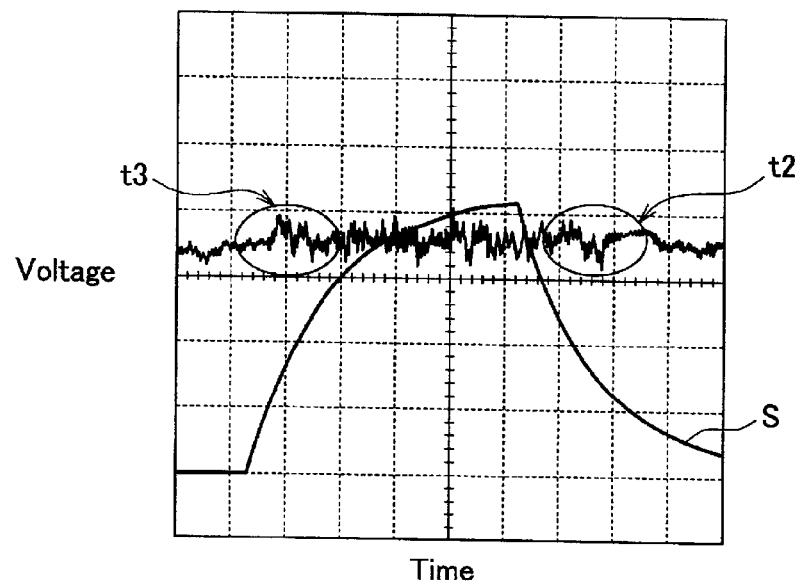
FIG. 10 represents a sensitivity switching signal and a PIR signal waveform which are produced at the output stage of the sensitivity correction circuit applied in the present embodiments.
Figure 11:
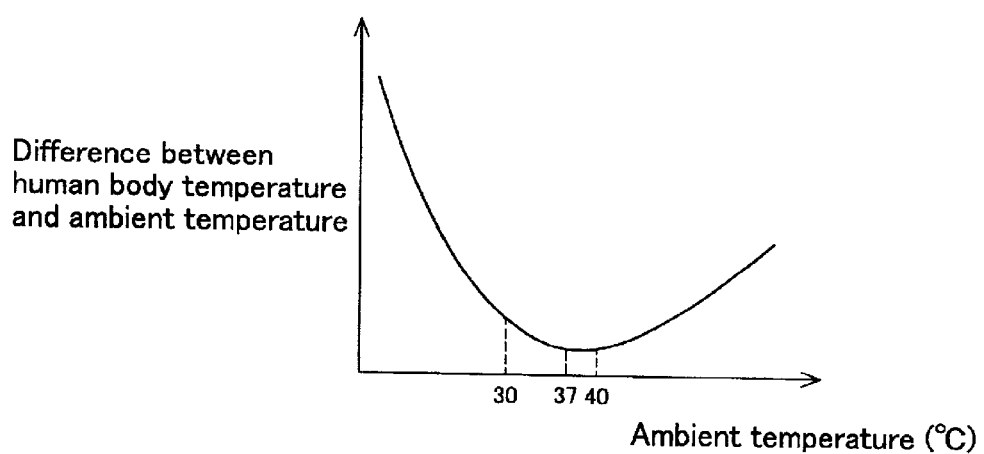
FIG. 11 represents the relation of the difference between human body temperature and ambient temperature, with respect to the ambient temperature, in the case of a differential infrared detector with no sensitivity correction.

By way of example, the second temperature range is supposed to be set from 30° C. to 40° C. which is around the surface temperature of a human body. If the ambient temperature is within this temperature range, the sensitivity switching signal is produced so as to increase the amplifier gain and correct the detection sensitivity. Owing to the capacitor $C_1$, and the resistor $R_3$, the signal waveform S of the sensitivity switching signal rises and falls gently, as shown in FIG. 10. Therefore, the FET 15 is turned on and off moderately, on generation of the sensitivity switching signal.

As a result, this embodiment can avoid noises when the sensitivity is switched (t2 and t3 in FIG. 10), so that continuous change of the output does not affect an analog signal.

Figure 3:
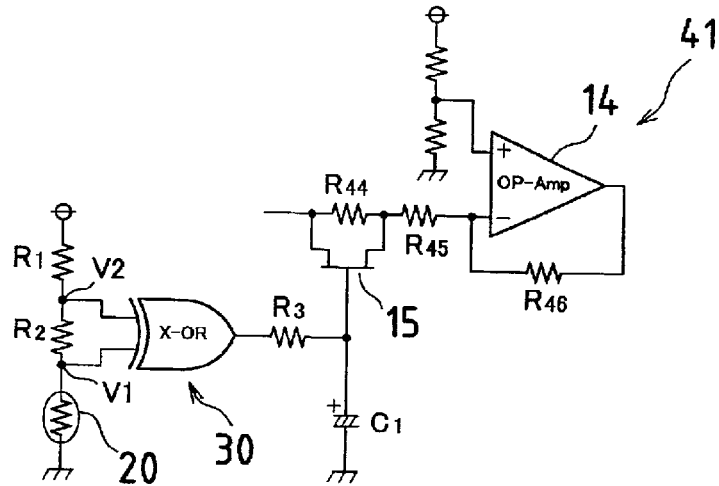
FIG. 3 is a main circuit diagram of a second embodiment of the present invention.
Figure 4:
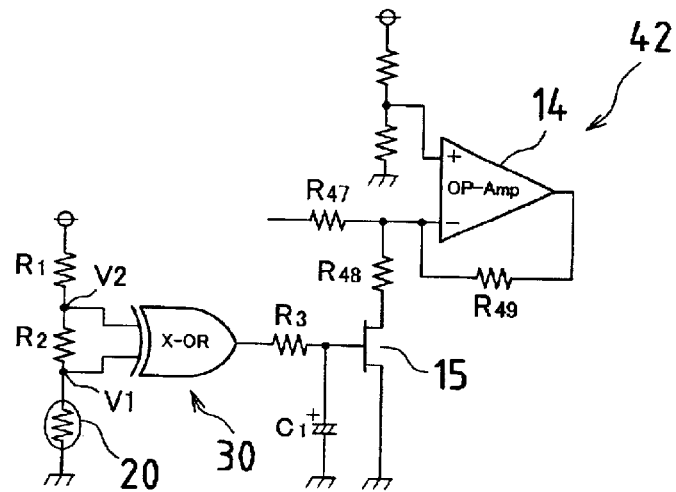
FIG. 4 is a main circuit diagram of a third embodiment of the present invention.

Turning to FIG. 3 and FIG. 4, respectively, the second and third embodiments relate to further examples of increasing an amplifier gain. These embodiments have the same arrangements as the first embodiment, except for the amplifier circuit. The identical constituents are indicated by the same signs and their description is omitted.

An amplifier circuit 41 of the second embodiment adopts another input structure for the operational amplifier 14, as compared with the arrangement of the first embodiment. On the input side, resistors $R_{44}$, $R_{45}$, and a feedback resistor $R_{46}$ are disposed differently.

An amplifier circuit 42 of the third embodiment adopts still another input structure for the operational amplifier 14. On the input side, resistors $R_{47}$, $R_{48}$ and a feedback resistor $R_{49}$ are disposed differently.

The operations and effects of the second and third embodiments are similar to those of the first embodiment.

Figure 5:
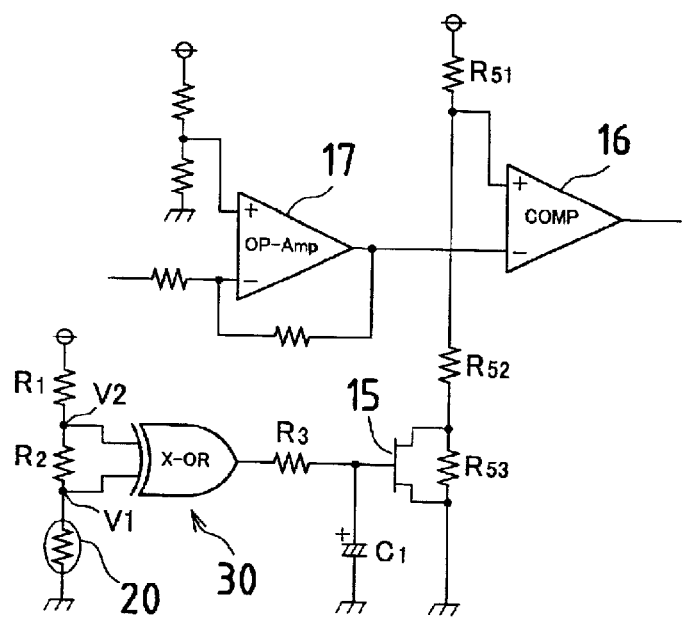
FIG. 5 is a main circuit diagram of a fourth embodiment of the present invention.

In the case of the foregoing embodiments, the amplifier gain is increased for the purpose of increasing detection sensitivity of the detection signal, provided that the ambient temperature is within a predetermined temperature range. Alternatively, the detection sensitivity may be increased by reducing a trigger level. The fourth embodiment concerns the latter arrangement, and FIG. 5 is a main circuit diagram thereof.

This embodiment is similar to the preceding embodiments, with respect to the structure of the ambient temperature detection circuit 2, and the logic circuit 30, the capacitor $C_1$, and the resistor $R_3$ in the sensitivity correction circuit 3. The fourth embodiment is distinguished by the structure in the later stage of the FET 15. In detail, a comparator 16 is fed with an input voltage which is variable by changing the resistance ratio of three series-connected resistors $R_{51}$, $R_{52}$, $R_{53}$ and also fed with an output voltage from an operational amplifier 17. As a result, the trigger level is lowered as shown in FIG. 9(b). This arrangement also ensures the operation and effect as achieved in the previous embodiments.

Figure 6:
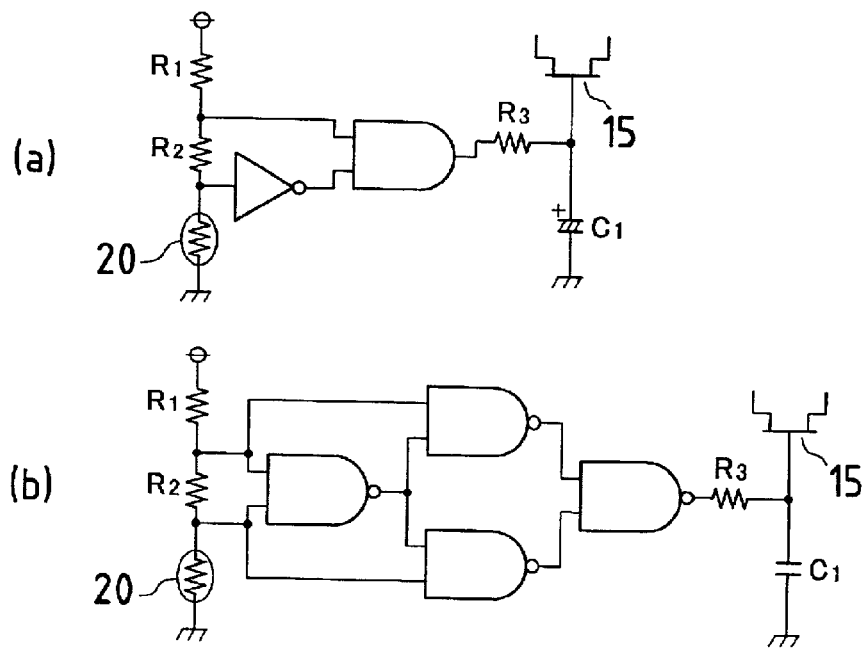
FIGS. 6(a) and (b) show equivalent circuits of the XOR circuit utilized in the first to fourth embodiments of the present invention.

Incidentally, the logic circuit 30 utilized in the first to fourth embodiments should not be limited to the above-mentioned XOR circuit. In addition, equivalent circuits of the XOR circuit are also applicable. To give a few examples, the AND-INVERTER circuit shown in FIG. 6(a) and the NAND circuit shown in FIG. 6(b) can constitute the logic circuit.

Figure 7:
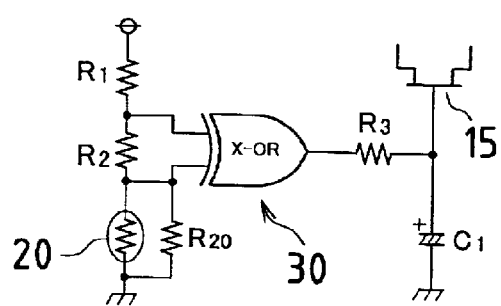
FIG. 7 is a main circuit diagram of a modified embodiment of the present invention.

Further, in order to give linearity characteristics to the thermistor 20, the above circuit examples may include a resistor $R_{20}$ which is connected in parallel, branching from between the thermistor 20 and the resistor $R_2$ and joining up between the thermistor 20 and the ground (see FIG. 7). This arrangement advantageously facilitates determination of the constant of the resistors $R_1$, $R_2$ and thus simplifies the circuit design.

In another respect, the sensitivity switching part of the present embodiments is comprised of a FET. Alternatively, a transistor, analog switch and the like may be used as such.

In yet another respect, the present embodiments employ a thermistor in the ambient temperature detection circuit 2. However, the thermistor may be replaced with any element whose resistance varies with temperature. For example, a diode can be used as such.

As described above, the embodiments of this invention are arranged to increase the detection sensitivity only when the ambient temperature is within a predetermined temperature range, thereby materializing a high-precision detector which allows for the temperature of a detection object. If these embodiments are applied to a human detector, detection precision of the resulting detector will not deteriorate in an environment where the ambient temperature is near the surface temperature of a human body. Thus, the human detector can ensure high detection precision in a wider temperature range.

Furthermore, unlike the prior art which requires a macroprocessor, the embodiments of this invention are attainable by means of a simple logic circuit. Therefore, these embodiments can provide a high-precision detector at a low production cost, thus showing an economic advantage as well.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description. All changes which come within the meaning and range of equivalency of the claims are therefore intended to be embraced therein.

What is claimed is:

1. An improved differential infrared detector of the type having: a detection element which detects infrared radiation in a predetermined detection area, converts a radiation energy thereof into an electric signal, and outputs the signal; and a discrimination circuit which calculates, based on the output signal, a variation amount of the radiation energy which varies on entry of a person into the detection area, the discrimination circuit comparing the variation amount with a predetermined level and, if the variation amount is equal to or greater than the predetermined level, generating a human body detection signal, wherein the improvement comprises:

an ambient temperature detection circuit which generates a voltage, based on an ambient temperature in the detection area; and a sensitivity correction circuit which receives the voltage from the ambient temperature detection circuit and discriminates, based on the received voltage, whether the ambient temperature is within a predetermined temperature range, the sensitivity correction circuit being arranged to increase detection sensitivity of the output signal produced by the detection element, if the ambient temperature is within the predetermined temperature range.

2. The differential infrared detector according to claim 1, wherein the ambient temperature detection circuit comprises a thermistor and two series-connected resistors one of which is connected with the thermistor, and wherein the sensitivity correction circuit comprises a logic circuit which receives input voltages composed of a voltage between the two resistors and a voltage between the thermistor and the resistor connected with the thermistor, the logic circuit discriminating, based on the input voltages, whether the ambient temperature is within a predetermined temperature range, and, if the ambient temperature is within the predetermined temperature range, the logic circuit generating a sensitivity switching signal for increasing an amplifier gain.

3. The differential infrared detector according to claim 2, wherein the sensitivity correction circuit comprises an amplifier circuit which is connected to a later stage of the logic circuit and which has a plurality of resistors provided on an input side of the amplifier circuit, and wherein an increase rate of the amplifier gain is determined by a resistance ratio of these resistors.

4. The differential infrared detector according to claim 3, wherein the ambient temperature detection circuit is constituted with an Exclusive-OR circuit.

5. The differential infrared detector according to claim 4, wherein the ambient temperature detection circuit is constituted with an equivalent circuit of the Exclusive-OR circuit.

6. The differential infrared detector according to claim 3,
wherein a resistor is connected in between an output stage of the ambient temperature detection circuit and a previous stage of the sensitivity correction circuit, and also connected in series with a grounded capacitor, and
wherein a voltage between the resistor and the capacitor is supplied, as a sensitivity switching signal, to the sensitivity correction circuit.

7. The differential infrared detector according to claim 2, wherein the logic circuit is constituted with an Exclusive-OR circuit.

8. The differential infrared detector according to claim 7, wherein the logic circuit is constituted with an equivalent circuit of the Exclusive-OR circuit.

9. The differential infrared detector according to claim 2,
wherein a resistor is connected in between an output stage of the ambient temperature detection circuit and a previous stage of the sensitivity correction circuit, and also connected in series with a grounded capacitor, and
wherein a voltage between the resistor and the capacitor is supplied, as a sensitivity switching signal, to the sensitivity correction circuit.

10. The differential infrared detector according to claim 1,
wherein the ambient temperature detection circuit a thermistor and two series-connected resistors one of which is connected with the thermistor, and
wherein the sensitivity correction circuit comprises a logic circuit which receives input voltages composed of a voltage between the two resistors and a voltage between the thermistor and the resistor connector with the thermistor, the logic circuit discriminating, based on the input voltages, whether the ambient temperature is within a predetermined temperature range, and, if the ambient temperature is within the predetermined temperature range, the logic circuit generating a sensitivity switching signal for lowering a trigger level.

11. The differential infrared detector according to claimed 10,
wherein the sensitivity correction circuit comprises a comparator which is connected to a later stage of the logic circuit and which has a plurality of resistors provided on an input side of the comparator, and
wherein a lowering rate of the trigger level is determined by a resistance ratio of these resistors.

12. The differential infrared detector according to claim 11, wherein the ambient temperature detection circuit is constituted with an Exclusive-OR circuit.

13. The differential infrared detector according to claim 12, wherein the ambient temperature detection circuit constituted with an equivalent circuit of the Exclusive-OR circuit.

14. The differential infrared detector according to claim 11,
wherein a resistor is connected in between an output stage of the ambient temperature detection circuit and a previous stage of the sensitivity correction circuit, and also connected in series with a grounded capacitor, and
wherein a voltage between the resistor and the capacitor is supplied, as a sensitivity switching signal, to the sensitivity correction circuit.

15. The differential infrared detector according to claim 10, wherein the ambient temperature detection circuit is constituted with an Exclusive-OR circuit.

16. The differential infrared detector according to claim 15, wherein the ambient temperature detection circuit is constituted with an equivalent circuit of the Exclusive-OR circuit.

17. The differential infrared detector according to claim 10,
wherein a resistor is connected in between an output stage of the ambient temperature detection circuit and a previous stage of the sensitivity correction circuit, and also connected in series with a grounded capacitor, and
wherein a voltage between the resistor and the capacitor is supplied, as a sensitivity switching signal, to the sensitivity correction circuit.

18. The differential infrared detector according to claim 1,
wherein a resistor is connected in between an output stage of the ambient temperature detection circuit and a previous stage of the sensitivity correction circuit, and also connected in series with a grounded capacitor, and
wherein a voltage between the resistor and the capacitor is supplied, as a sensitivity switching signal, to the sensitivity correction circuit.

19. A system for use with a differential infrared detector comprising a detection element operable to detect infrared radiation in a predetermined detection area, to convert a radiation energy thereof into an electric signal, and to output the signal and a discrimination circuit operable to calculate, based on the output signal, a variation amount of the radiation energy which varies on entry of a person into the detection area, to compare the variation amount with a predetermined level and, if the variation amount is equal to or greater than the predetermined level, to generate a human body detection signal, said system comprising:
an ambient temperature detection circuit operable to generate a voltage, based on an ambient temperature in the detection area; and
a sensitivity correction circuit operable to receive the voltage from the ambient temperature detection circuit and to discriminate, based on the received voltage, whether the ambient temperature is within a predetermined temperature range,
wherein the sensitivity correction circuit is arranged to increase detection sensitivity of the output signal produced by the detection element, if the ambient temperature is within the predetermined temperature range.

* * * * *